(12) United States Patent
Bouchard et al.

(10) Patent No.: US 7,912,061 B2
(45) Date of Patent: Mar. 22, 2011

(54) METHOD, SYSTEM AND APPARATUS FOR CONTROLLING THE ESTABLISHMENT OF A DATA CONNECTION FROM AN ORIGINATING DATA DEVICE

(75) Inventors: Jean Bouchard, Billery (CA); Sebastien Gadbois, Saint-Nicolas (CA); Stephane Fortier, Breakeyville (CA)

(73) Assignee: BCE Inc., Verdun, Quebec (CA)

( * ) Notice: Subject to any disclaimer, the term of this patent is extended or adjusted under 35 U.S.C. 154(b) by 443 days.

(21) Appl. No.: 11/553,326

(22) Filed: Oct. 26, 2006

(65) Prior Publication Data
US 2007/0091892 A1 Apr. 26, 2007

(30) Foreign Application Priority Data
Oct. 26, 2005 (CA) ................................. 2524536

(51) Int. Cl.
H04L 12/28 (2006.01)
(52) U.S. Cl. ........................................................ 370/392
(58) Field of Classification Search .................. 370/392, 370/401; 379/196–200
See application file for complete search history.

(56) References Cited

U.S. PATENT DOCUMENTS

| 5,090,049 A | 2/1992 | Chen |
| 5,859,967 A | 1/1999 | Kaufeld et al. |
| 6,081,588 A * | 6/2000 | Ranalli et al. ............ 379/100.09 |
| 6,366,950 B1 | 4/2002 | Scheussler et al. |
| 6,404,870 B1 * | 6/2002 | Kia et al. ................. 379/144.01 |
| 6,535,506 B1 * | 3/2003 | Narain et al. ................. 370/352 |
| 6,760,420 B2 * | 7/2004 | Heilmann et al. ............ 379/189 |
| 6,937,713 B1 * | 8/2005 | Kung et al. ............... 379/211.02 |
| 2002/0176117 A1 | 11/2002 | Randalli et al. |
| 2003/0076941 A1 * | 4/2003 | Tiliks et al. .................... 379/196 |
| 2003/0129967 A1 | 7/2003 | Verona |
| 2004/0052376 A1 * | 3/2004 | Fisher et al. .................. 380/257 |
| 2004/0075872 A1 | 4/2004 | Adler et al. |
| 2004/0158733 A1 | 8/2004 | Bouchard |
| 2005/0282575 A1 * | 12/2005 | Dorenbosch ............... 455/550.1 |

OTHER PUBLICATIONS

K. Mimura et al., Internet FAX Gateway Requirements, Network Working Group, Jan. 18, 2005, 13 pages, http://ietfreport.isoc.org/idref/draft-ietf-fax-gateway-protocol/.
PCT/CA2006/001763 (ISR), Mar. 6, 2007, BCE Inc. et al.
International Preliminary Report on Patentability completed on Mar. 19, 2008 in connection with International Patent Application No. PCT/CA2006/001763.

* cited by examiner

*Primary Examiner* — Salman Ahmed
*Assistant Examiner* — Hai-Chang Hsiung

(57) ABSTRACT

According to embodiments of the present invention a method, system and apparatus for controlling the establishment of a data connection from an originating data device is disclosed. A computing apparatus, such as a server, receives a request from an originating data device, such as a fax machine, to establish a data connection with a destination data device, such as a second fax machine. The request may comprise an identifier associated with the destination data device and may include an authorization code. The server determines if the request is authorized based upon at least one of the destination identifier and the authorization code, and triggers a connection between the originating and destination data devices if authorized. The destination identifier may be the phone number or IP address of a destination data device. The authorization code may be a numeric code which will allow a user to establish a data connection between the originating data device and a nominally restricted data device.

38 Claims, 9 Drawing Sheets

| Restricted Network Identifier 310 | First Restriction 312 OID Restricted | Second Restriction 314 DID Restricted |
|---|---|---|
| 416-555-1234 | Yes | No |
| 416-555-1235 | Yes | Yes |
| 204-555-1236 | No | Yes |
| 204-555-1237 | No | No |

METHOD, SYSTEM AND APPARATUS FOR CONTROLLING THE ESTABLISHMENT OF A DATA CONNECTION FROM AN ORIGINATING DATA DEVICE

CROSS-REFERENCE TO RELATED APPLICATION

The present application claims the benefit under 35 U.S.C. 119(a) of Canadian Patent Application Serial No. 2,524,536, to Jean Bouchard et al., filed on Oct. 26, 2005, hereby incorporated by reference herein.

FIELD OF THE INVENTION

This invention relates generally to communication networks and more specifically to a method, system and apparatus for controlling the establishment of a data connection from an originating data device.

BACKGROUND OF THE INVENTION

Transmission of data through a communications network has become a commonplace activity in modern life and business, for example when using a dial-in modem to access the internet through a dial-in server via the PSTN, or faxing documents to a destination fax machine or fax server. Indeed faxing is considered by most businesses to be a secure method of transmitting data, including confidential information. Documents to be transmitted are placed in an originating fax machine, the documents are scanned and the resulting data is rendered into a form suitable for transmission through a communications network, such as the PSTN. The address of the destination fax machine, typically its phone number, is entered into the originating fax machine, and the transmission sequence commences, typically by pressing a send button. The originating fax machine initiates a call through the communications network, the destination fax machine answers the call, and a data transmission session is negotiated between with the two fax machines. The destination fax machine then receives the data transmitted from the originating fax machine, renders the data into a form representing the original documents, and prints out copies of the documents being transmitted. Presuming the destination fax machine is known to the user of the originating fax machine, the transmission is as secure as the communications network over which the transmission occurs.

However should the user of the originating fax machine incorrectly enter the phone number of the destination fax machine, such that an unknown fax machine receives the data transmission, there is no means for the user to ensure that the destination fax machine is the intended destination. This may occur if a user inadvertently enters a wrong phone number to which a fax machine is connected; or the user may believe the destination number to be correct when, in fact, the number belongs to a party which is unknown to the user, for example if an incorrect fax number is distributed by a business to it's employees. This situation could result in confidential information being transmitted to unknown persons, with a consequence being the public divulgence of confidential information of a business or its customers. In some situations key information could end up in the hands of a competitor, or persons who might use the information for fraudulent means.

There remains a need therefore for an improved system, method and apparatus for controlling the establishment of a data connection from an originating data device.

SUMMARY OF THE INVENTION

A first broad aspect of the invention seeks to provide a method for controlling the establishment of a data connection from an originating data device, the method being executable within a system comprising a computing apparatus connectable to the originating data device via a network. The method comprises receiving a request from said originating data device for a session with a destination data device, the request comprising at least one of a destination identifier, associated with said destination device, and an authorization identifier. Further, the method comprises determining if the request is authorized based upon the at least one of a destination identifier and an authorization identifier, and triggering the establishment of a connection between said originating data device and said destination data device if authorized.

In some embodiments of the present invention, the method further comprises receiving an originating identifier associated with said originating data device and determining if the originating data device is authorized to make the request based upon the originating identifier. These embodiments may further include determining if the request is authorized and not performing the triggering of the establishment of a connection, if the originating device is not authorized to make the request. In some implementations the triggering step occurs only if the originating identifier is authorized and the at least one of a destination identifier and an authorization identifier is authorized.

In some embodiments, receiving the request comprises establishing communications with the originating data device and receiving the originating identifier occurs during the establishing of communications.

In some embodiments, the network may be a telephone network and the originating identifier is a telephone number associated with said originating data device. In other embodiments the network may be a packet based network and the originating identifier is an internet protocol address associated with said originating data device.

In some embodiments, determining if the originating device is authorized may comprise determining if the originating identifier is within a set of one or more approved originating identifiers.

In other embodiments of the first broad aspect, the method may further comprise establishing a connection between the originating data device and the destination data device if triggered.

In further embodiments of the first broad aspect, the request comprises an authorization identifier and determining if the request is authorized may comprise determining if the authorization identifier is within a set of one or more approved authorization identifiers.

In this case, the authorization identifier may be associated with a specific user of the originating data device.

In other embodiments of the first broad aspect, the request comprises a destination identifier and determining if the request is authorized may comprise determining if the destination identifier is within a set of one or more approved destination identifiers. In this case, the request may further comprise an authorization identifier and, if the destination identifier is not within the set of one or more approved destination identifiers, determining if the request is authorized may further comprise determining if the authorization identifier is within a set of one or more approved authorization identifiers; further the request may be authorized if the authorization identifier if within the set of one or more approved authorization identifiers.

In other embodiments of the first broad aspect, the request comprises a destination identifier and determining if the request is authorized may comprise determining if the destination identifier is not within a set of one or more restricted destination identifiers. In this case, the request may further comprise an authorization identifier and, if the destination identifier is within the set of one or more restricted destination identifiers, determining if said request is authorized may further comprise determining if the authorization identifier is within a set of one or more approved authorization identifiers; further the request may be authorized if the authorization identifier if within the set of one or more approved authorization identifiers.

In other embodiments of the first broad aspect, the request may comprise a destination identifier, the network is a telephone network and determining if said request is authorized may comprise determining if the destination identifier is representative of a non-toll telephone number. In this case the request may further comprise an authorization identifier if the destination identifier is representative of a toll telephone number, and determining if the request is authorized may further comprise determining if the authorization identifier is within a set of one or more approved authorization identifiers; further the request may be authorized if the authorization identifier if within the set of one or more approved authorization identifiers.

In other embodiments of the first broad aspect, the network is a telephone network and triggering the establishment of a connection between the originating data device and the destination data device may comprise sending a call control command to the telephone network. In this case the call control command may comprise a release link trunking signal. Alternatively the call control command may comprise a dynamic toll-free gateway signal.

In other embodiments of the first broad aspect, the network is a packet based network and triggering the establishment of a connection between the originating data device and the destination data device may comprise sending a packet based signal to the packet-based network.

In some embodiments, the originating data device may be a fax machine and the destination data device may be a fax machine. In further embodiments the originating data device may be a modem and the destination data device may be a modem.

A second broad aspect of the present invention seeks to provide a computing apparatus for controlling the establishment of a data connection from an originating data device; the computing apparatus may be connectable to the originating data device via a network. The computing apparatus includes an interface operable to receive a request via the network from the originating data device for a session with a destination data device, the request comprising at least one of a destination identifier associated with the destination device and an authorization identifier. The computing apparatus further includes a processing apparatus, coupled to the interface, operable to determine if the request is authorized based upon the at least one of a destination identifier and an authorization identifier, and further operable to trigger the establishment of a connection between the originating data device and the destination data device if authorized.

A third broad aspect of the present invention seeks to provide a computing apparatus for controlling the establishment of a data connection from an originating data device; the computing apparatus may be connectable to the originating data device via a network. The computing apparatus includes means for receiving a request from the originating data device for a session with a destination data device, the request comprising at least one of a destination identifier associated with the destination device and an authorization identifier. The computing apparatus further includes means for determining if the request is authorized based upon the at least one of a destination identifier and an authorization identifier. The computing apparatus further includes means for triggering the establishment of a connection between the originating data device and the destination data device if authorized.

A fourth broad aspect of the present invention seeks to provide a system for controlling the establishment of a data connection between an originating data device and a destination data device. The system includes a network connectable to said originating data device and said destination data device. The system further includes a computing apparatus coupled to the network, operable to authorize and trigger the establishment of a data connection between the originating data device and the destination data device, based upon at least one of a destination identifier and an authorization identifier received from the originating data device.

BRIEF DESCRIPTION OF THE DRAWINGS

Embodiments of the present invention are described with reference to the following figures, in which:

FIG. 3a is a diagram illustrating a restricted network identifiers table according to one embodiment of the present invention;

DETAILED DESCRIPTION OF THE PRESENT INVENTION

Figure 1A:
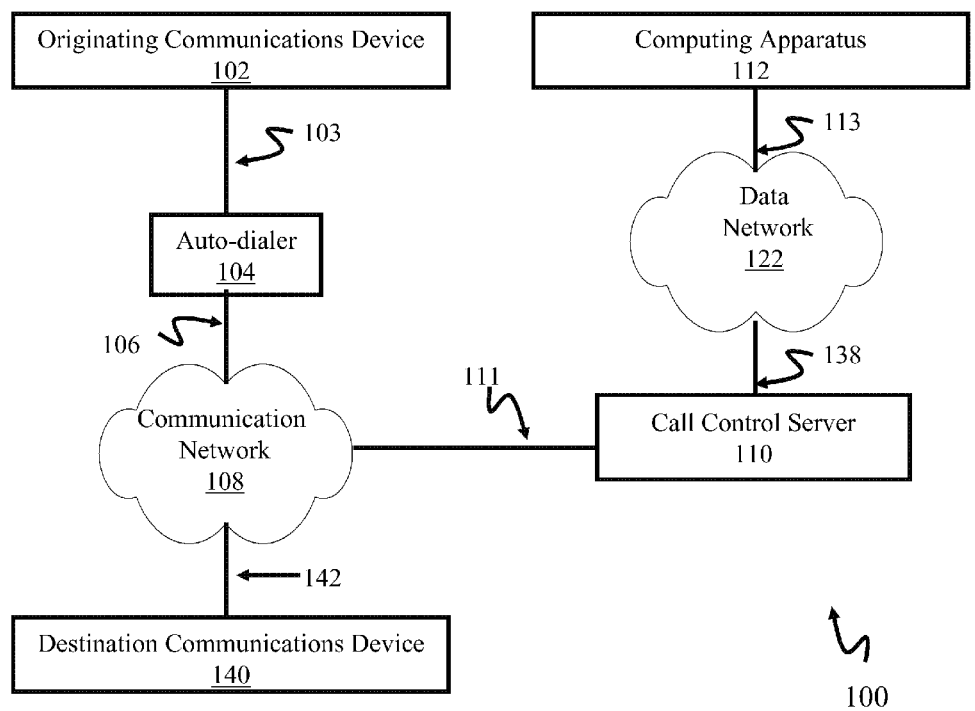
FIG. 1a is a block diagram illustrating a system for controlling the establishment of a data connection from an originating data device according to one embodiment of the present invention.

FIG. 1a depicts a system 100 for the establishment of a data connection from an originating data device through a communications network according to an embodiment of the present invention. The system comprises an originating communications device 102 in communication with an autodialer 104 via a first communications link 103; second communications link 106 further connects the autodialer 104 to a communications network 108. The originating communications device 102 may be any communications device configured to accept data from a user, render the data into a form suitable for transmission through communications network 108, further accept input of a network identifier of a destination communications device 140 to which the data is to be transmitted, initiate a data transmission session with the destination communications device, and transmit the data over the communications network 108 to the destination communications device 140. Non-limiting examples of an originating communications device 102 include fax machines and a dial-up modems, however it is understood that similar communications devices are included within the scope of the invention. In a further embodiment, originating communications device 102 may include an equivalent software embodiment of a hardware based originating communications device residing on a computing apparatus, including the software equivalent of a fax machine, or similar communications devices, the computing apparatus including input/output apparatus to enable communication with communications network 108.

Communications network 108 may include any network which allows for transmission of data from an originating address to a destination address. Specific non-limiting examples include: the PSTN, including PBX and Centrex networks; and networks enabled to transmit voice over internet protocol transmissions (VOIP), which may include packet switched networks such as the public internet, or an intranet such as a LAN or a WAN. The first communications link 103 may be a wire line link, such as a twisted pair copper line or a coaxial cable both of which are well known in the art, or a wireless communications link, such as a CDMA, GSM, WiFi or WiMax link. It is understood that in embodiments where first communication link 103 is a wireless communication link, apparatus suitable for enabling wireless communication may be included within said embodiments, as well as suitable encryption of said wireless communication link.

It is further understood that second communications link 106 may be a wire line link, such as a twisted pair copper line or a coaxial cable both of which are well known in the art, or a wireless communications link, such as a CDMA, GSM, WiFi or WiMax link. Further, second communications link 106 may include apparatus which provides an interface between different types of communications network standards; in a non-limiting example, if originating communications device 102 and autodialer 104 are PSTN based devices, and communications network 108 is a packet switched network, then second communications link 106 may include an Analog Telephone Adapter (ATA) to translate analog PSTN based signals, originating from the originating communications device 102, and sent through said autodialer 104, to packet-based signals suitable for transmission over said communications network 108. It is understood that in some embodiments said ATA may reside proximate to autodialer 104, while in further embodiments, a network based ATA may be employed, residing at a central office within communications network 108. It is understood that in embodiments where second communication link 106 is a wireless communication link, apparatus suitable for enabling wireless communication may be included within said embodiments, as well as suitable encryption of said wireless communication link.

It is further understood that the originating communications device 102 and associated autodialer 104 may be representative of a plurality of similar devices in communication with the communications network 108. Such devices may be located in a single facility, such as an office building, or geographically separated such as in different branches of a business.

Communications network 108 is in further communication with the destination communications device 140 associated with the network identifier entered into the originating communications device 102, via a third communications link 142. Destination communications device 140 may be similar to originating communications device 102, and may be any communications device configured to receive data from the originating communications device 102 through communications network 108, and render the data into form representative of the original user data. The destination communications device 140 may be further configured to transmit data to other similar communications devices. Specific non-limiting examples include fax machines and dial-up modems, however it is understood that similar communications devices are included within the scope of the invention. In a further embodiment, destination communications device 140 may include an equivalent software embodiment of a hardware based originating communications device residing on a computing apparatus, including the software equivalent of a fax machine, or similar communications devices, the computing apparatus including input/output apparatus to enable communication with communications network 108.

In embodiments where originating communications device 102 or destination communications device 140 are enabled to communicate over a communications network, different from that of communications 108, interface devices may be included between communications network 108 and originating communications device 102. Interface devices may further be included between communications network 108 and destination communications device 140, to adapt communications or data transmissions into a form suitable for transmission through communications network 108. In a non-limiting example, communications network 108 comprises the public internet and at least one of originating communications device 102 or destination communications device 140 is a fax machine adapted for communication over the PSTN; analog terminal adapters (ATA) may be then included between each device and communications network 108. However, in a further non-limiting example, communications network 108 comprises the public internet and at least one of originating communications device 102 or destination communications device 140 is a fax machine adapted for communication over the public internet, for example fax over internet protocol (FoIP) and hence no interface device is necessary.

Communications network 108 is in further communication with call control server 110 through a fourth communications link 111. Autodialer 104 is configured to automatically initiate communications with call control server 110 when originating communications device 102 initiates a data transmission session through the communications network 108. Originating communications device 102 is then further configured to transmit the destination network identifiers and associated data, such as passwords etc., once the call control server 110 has been engaged. In the non-limiting example of the originating communications device 102 being a fax machine, this may occur when a user enters a destination phone number and presses the send button; autodialer 104 is enabled to detect when the fax machine engages communications network 108 by going off-hook and intervenes, dialling the number of call control server 110. The fax machine then transmits the destination phone number, typically by playing the dual tone multi frequency (DTMF) tones, as is well known to those of skill in the art, and associated information such as passwords etc., to call control server 110 rather than to switching equipment within communications network 108. In one embodiment the originating communications device 102 may be configured with a built in delay between pressing the send button and transmitting the data; in another embodiment the originating communications device 102 may be configured to detect when the call control server 110 has been engaged prior to transmission of said data.

In an alternative embodiment autodialer 104 may be enabled to receive and record the destination network identifier and associated information such as passwords etc. as transmitted by originating communications device 102, for example in the form of DTMF tones, before, during or after it engages call control server 110. When call control server 110 is engaged autodialer 104 may be further configured to transmit the recorded data. In one embodiment autodialer 104 may be configured with a built in delay between pressing the send button and transmitting the recorded data; in another embodiment autodialer 104 may be configured to detect when the call control server 110 has been engaged prior to transmission of said data.

Autodialer 104 may be a hardware autodialer or a logical autodialer. Examples of hardware autodialers include those manufactured by MaxLink Information Technologies, 14th Floor Dawn Building, High Tech Park, ShenZhen, China, 518057 such as the MaxLink 860K. However autodialer 104 may be incorporated directly into the originating communications device 102, as additional hardware, firmware or software. Further, autodialer 104 may also represent a logical switch residing in communication network 108, such that any initiation of communications by the originating communications device 102 with the communication network 108 will result in communications device 102 being connected to call control server 110. Logical autodialers are well known in the art as an available feature of telephony switches, for example the DMS line of switches from Nortel Networks, 8200 Dixie Road, Brampton, Ontario CANADA L6T 5P6.

In yet another embodiment autodialer 104 may comprise software residing on a computing apparatus which includes input/output apparatus to enable communication with both originating communications device 102 and communications network 108. In embodiments where originating communications device 102 also comprises software residing on a computing apparatus, autodialer 104 may reside on the same computing apparatus as either software integrated into originating computing device 102 or separate software which interfaces with originating computing device 102. Other combinations of originating communications device 102 and autodialer 104 may occur to those with skill in the art and are within the scope of the present invention.

In embodiments where autodialer 104 is an apparatus separate from originating communications device 102 it is understood that some autodialers 104 may be adapted to communicate with a plurality of originating communications devices 102, and is further configured for multiple data transmission sessions through communications network 108.

One skilled in the art will appreciate that in certain embodiments of the present invention, connections over communications network 108 and data network 122 are secure communications. In one specific non-limiting example, communication over the data network 122 can utilize VPN-based security solutions. In other embodiments, IP Sec tunnel, PKI-based or any other security solution known in the art can be applied.

With further reference to FIG. 1a call control server 110 is connected to communications network 108. In some embodiments of the present invention, call control server 110 is located in a location distinct from that of the originating communications device 102. In other embodiments, the call control server 110 can be co-located with the originating communications device 102. Call control server 110 can be dedicated to controlling the destination of a data transmission through a communications network or can be "shared" for provisioning of other applications.

Components of call control server 110 will now be explained in greater detail with reference to FIG. 1b. Call control server 110 comprises a data input/output (I/O) apparatus 124, a data control apparatus 128, an administrative control module 130 and a call database 132 interconnected by a local area network (LAN) 134. The data I/O apparatus 124 may include an interface 126 for connecting call control server 110 to communications network 108 via fourth communication link 111. Alternatively interface 126 may exist as a separate apparatus connected to the LAN 134. The LAN 134 can be further coupled to the data network 122 via a router 136. Router 136 can be any commercially available router, such as CISCO 837 manufactured and distributed by Cisco Systems, Inc. of 170 West Tasman Dr., San Jose, Calif. USA. Alternatively, any customer edge router can be used and one skilled in the art will appreciate that the exact router used will depend on several parameters, including but not limited to bandwidth, required level of security and the like.

The data I/O apparatus 124 comprises hardware and logic (not shown) required to receive a data transmission via the communications network 108 and to receive a network identifier of second communications link 106 associated with originating communications device 102, including caller line identification (CLID) information. The data I/O apparatus 124 may further comprise a DTMF tone reader for recognizing DTMF tones from originating communications device 102, and may further include means for providing information and prompts to originating communications device 102. For example in the non-limiting example where originating communications device 102 is a fax machine, data I/O apparatus 124 may include means to provide voice information through speaker apparatus included in said fax machine; alternatively data I/O apparatus 124 may include means to provide text information through a display apparatus included in said fax machine. All of these means are well known in the art and not depicted for the sake of simplicity.

The data I/O apparatus 124 may be further operable to play back audio files (such as WAV files or the like), to provide voice prompts to the user, and voice recording. Other functions performed by data I/O apparatus 124 will become apparent to those skilled in the art having regard to the teachings of this invention. In one embodiment, the data I/O apparatus 124 can comprise an HP Proliant DL380 G2 Server (Dual CPU 1.4 GHz Intel Pentium III, RAM 2 Gigs, 2 NMS CG6000 card) manufactured by Hewlett-Packard Company of 3000 Hanover Street Palo Alto, Calif. USA with the RedHat Linux Enterprise Edition 3 WS software distributed by RedHat Corporation of 1801 Varsity Drive, Raleigh, N.C. USA. Even though the data I/O apparatus 124 has been described as being operable to perform a plurality of functions in some embodiments of the present inventions, it should be understood that in other embodiments of the present invention, some of these function may be performed at other devices.

The data control apparatus 128 is coupled to the data I/O apparatus 124 via the LAN 134 and is operable to control the data I/O apparatus 124, as will be described in greater detail hereafter.

Figure 2:
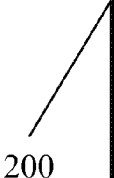
FIG. 2 is a diagram illustrating an allowed network identifiers table according to one embodiment of the present invention.

Call database 132 comprises at least one table, such as Table 200 depicted in FIG. 2. In some embodiments of the present invention, Table 200 comprises a set of allowed network identifiers 210, which collectively identify the set of originating communications devices 102 associated with allowed network identifiers 210, which are allowed to access the call control server 110. In one specific non-limiting example, the allowed network identifier 210 can be the CLID information, for example a telephone number, associated with second communications link 106 which connects communication device 102 to the communications network. In further embodiments, the allowed network identifier 210 can be any network identifier used for identification of the communication device 102 for the purposes of communication over the communication network 108. Table 200 may also include information identifying originating communications device 102 to a administrator of call control database 132, such as a serial number or a location, as well as a record of its inclusion in Table 200, for example which administrator entered the device information into Table 200 and on what date, and comments by the administrator. Further information associated with each network identifier 210 may be included in Table 200 and is within the scope of the present invention.

System 100 may be further configured to recognize a universal restriction or plurality of universal restrictions associated with the set of allowed network identifiers 210 described in Table 200. For example it may be understood that all originating communications devices authorized to use system 100, and identified in Table 200 by the set of allowed network identifiers 210, are allowed to communicate with and transmit data only to other originating communications devices 102, represented by allowed network identifiers 210, listed in Table 200. Other universal restrictions may occur to those with skill in the art and are included within the scope of the present invention.

Figure 3B:
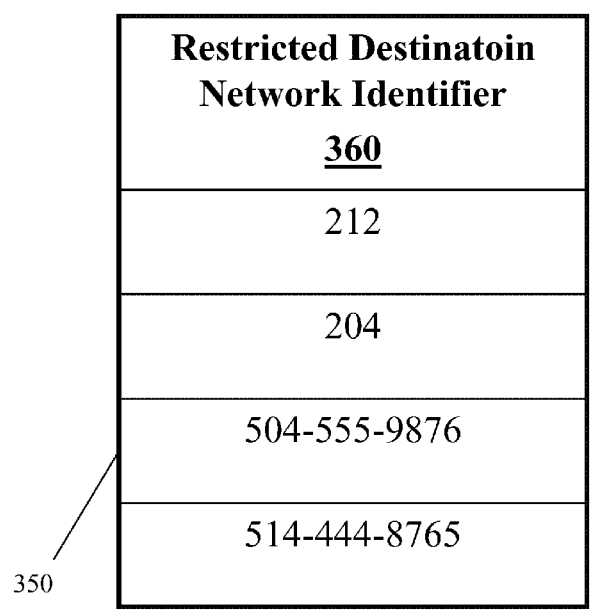
FIG. 3b is a diagram illustrating a restricted destination network identifier table according to one embodiment of the present invention.

Call database 132 may include a further table, such as Table 300 depicted in FIG. 3. In some embodiments of the present invention Table 300 comprises a set of network identifiers of originating communications devices 102 or destination communications devices 140, associated with restricted network identifiers 310, on which an administrator of call control server 110 has placed at least one restriction. In alternative embodiments Table 300 comprises a combined set of network identifiers of originating communications devices 102 and destination communications devices 140, associated with restricted network identifiers 310, on which an administrator of call control server 110 has placed at least one restriction. The allowed network identifier 310 can be any network identifier used for identification of the communication device 102 or destination communications device 140 for the purposes of communication over communication network 108. In one specific non-limiting example, the restricted network identifier 310 can be the CLID information, for example a telephone number, associated with originating communication device 102 or destination communications device 140.

The at least one restriction placed on restricted network identifier 310 may be a universal restriction associated with Table 300. For example restricted network identifiers 310 may represent the set of all destination communications devices 140 with which originating communications devices 102 are not allowed to communicate; in this embodiment it is understood that communication with a destination communications device 140, whose network identifier is not included in Table 300, is allowed. In an alternative embodiment restricted network identifiers 310 may represent the set of all destination communications devices 140 with which originating communications devices 102 are allowed to communicate; in this embodiment it is understood that communication with a destination communications device 140, whose network identifier is not included in Table 300, is restricted.

In further embodiments restricted network identifiers 310 may represent a set of originating communications devices 102 which are not allowed to communicate with destination communications devices 140. Other restrictions may include allowing originating communications devices 102, associated with restricted network identifiers 310, to communication only with a set of restricted destination network identifiers 360 contained in yet a further table, such as a Table 350 depicted in FIG. 3b. In this embodiment the set of restricted destination network identifiers 360 may include network identifiers defining a portion of a network, for example certain area codes within the PSTN, or specific communications links in a network, such as specific phone numbers within the PSTN, or a combination of said network identifiers. In this embodiment it is understood that communication with a destination communications device 140 whose network identifier is not included in Table 350 is restricted. In an alternative embodiment restricted network identifiers 360 may represent the set of all destination communications devices 140 with which originating communications devices 102, represented by restricted network identifiers 310, are not allowed to communicate; in this embodiment it is understood that communication with a destination communications device 140 whose network identifier is not included in Table 350 is allowed.

It is further understood that in all embodiments a plurality of universal restriction may be placed on the devices associated with restricted network identifiers 310.

Table 300 may further include subsets of restrictions, associated specifically with each restricted network identifier 310; by way of example only, two sets of restriction data, first restriction 312 and second restriction 314 are illustrated in FIG. 3a. However, in embodiments where a universal restriction or a plurality of universal restrictions is placed on Table 300, no restriction data subsets may be recorded. In some embodiments only one subset of restriction data may be recorded; in other embodiments three or more subsets of restriction data may be recorded.

First restrictions 312 and second restriction 314 indicate the specific restrictions placed on the originating communications device 102 or destination communications device 140 associated with each network identifier 310. For example first restriction data 312 may indicate if an originating communications device 102 associated with a restricted network identifier 310 is restricted from transmitting data, while second restriction 314 may indicate if a destination communications device 140 associated with a restricted network identifier 310 is restricted from receiving data. Returning to the non-limiting example of originating communications device 102 or destination communications device 140 being a fax machine, first restriction 312 may indicate those fax machines associated with each restricted network identifier 310 which are restricted from sending faxes while second restriction 314 may indicate destination fax machines which are restricted from receiving faxes. Further restrictions on the originating communications device 102 or destination communications device 140, represented by first restriction 312, second restriction 314 or further restrictions not depicted, may include transmissions to only a set of specific destination communications devices, transmissions to only specific area codes, transmissions to only local phone numbers, also known as non-toll phone numbers to those of skill in the art, transmissions to only international phone numbers and the like.

All restrictions described may also be universal restrictions. It is also understood that Table 300 may further include a subset of restrictions associated with restricted network identifiers which are not allowed to transmit or receive data under any conditions. Other restrictions will occur to those with skill in the art and are within the scope of the present invention.

Further restrictions may be placed on users, for example only specific users may be authorized to use specific originating communications devices 102, or to initiate transmissions to specific destination communications devices 140. In this embodiment originating communications device 102, is adapted to accept input of a user identifier or authorization identifier, which could be transmitted to call control server 110. In alternative embodiments a user identifier apparatus (not illustrated) may be connected to originating communications device to accept input of the user identifier. Non-limiting examples of a user identifier apparatus include a smartcard reader, a voiceprint reader, or biometric scanners, such as fingerprint or retina scanners. Further tables representing the restrictions placed on specific users may be included in database 132; in further embodiments user identifiers may be incorporated directly into Table 300 or Table 350.

Table 300 and Table 350 may also include information identifying communications devices associated with each restricted network identifier 310 or restricted destination identifier 360, to an administrator of database 132, such as a serial number or a location, as well as a record of it's inclusion in Table 300 or Table 350, for example which administrator entered the network identifier into Table 300 or Table 350, and comments by the administrator.

The call database 132 can comprise further tables (not depicted) that can contain information for billing purposes (such as call durations, etc.), call records and the like. In addition the call database 132 may include yet further tables (not depicted) that can contain information on authorized administrators of the call database 132 as well as a login history of these administrators.

Figure 1B:
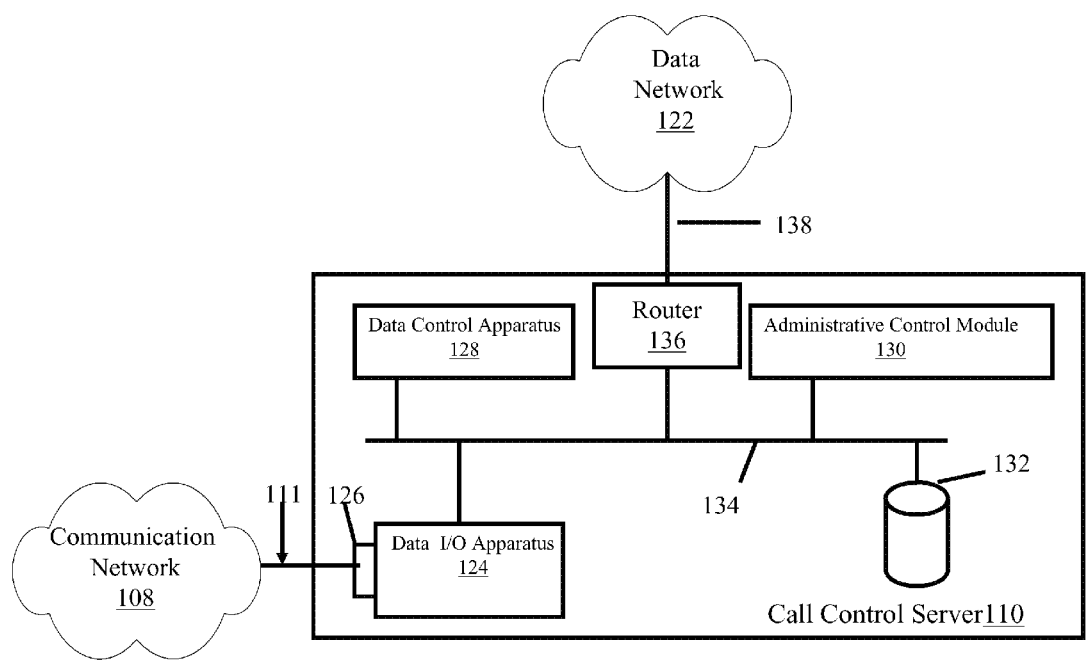
FIG. 1b is a block diagram illustrating components of a call control server deployed in the system for the establishment of a data connection from an originating data device according to one embodiment of the present invention.

With further reference to FIG. 1b, the administrative control module 130 allows administrators of system 100 to provision various parameters of the system 100. As will be appreciated by one of skill in the art, the administrative control module 130 comprises an interface (not shown) to allow administrators to access the administrative control module 130 either locally or via the LAN 134 and data network 122, typically, but not specifically limited to, using computing apparatus 112. Administrative tasks that can be performed by administrators using the administrative control module 130 can include but are not limited to: make changes and create new entries in the allowed network identifiers Table 200, in the restricted network identifiers Table 300, and in the restricted destination network identifiers Table 350, as well as further tables not illustrated, including but not limited to: amending the list of allowed and restricted network identifiers 210, and 310 and 360 respectively, amending or adding associated parameters 312, 314 or the like, run reports for billing and other purposes, create originating communications device specific reports and the like. Other administrative features will be apparent to those of skill in the art having regard to the teachings of the present invention.

Call control server 110 may be further enabled to route the connection using call control commands known to those of skill in the art. This functionality may include additional hardware components and software components. As a non-limiting example, call control server 110 may further include a dynamic toll-free gateway (DTFG) which may be connected to an external DTFG platform. Call control server 110 may be further adapted to route the connection via the most efficient path. In a non-limiting example, call control server 110 may be enabled to route some connections, for example local and domestic connections, via the DTFG, and other connections, for example international connections, through release link trunking (RLT), well known to those of skill in the art.

With further reference to FIG. 1a system 100 may further comprise a computing apparatus 112 in communication with a data network 122 via a fifth communications link 113, data network 112 in further communication with call control server 110 via sixth communications link 138. Computing apparatus 112 is operable to communicate with call control server 100 through the data network 122 according to embodiments of the present invention, and to exchange information with a call database 132 within the call control server, as will be described below. However it is understood that, in alternative embodiments, computing apparatus 112 may be in communication with call control server 110 through communications network 108. In these embodiments communication may occur over fourth communications link 111 or through an additional communications link connecting call control server 110 with communications network 108. Data network 122 may include any network which allows for transmission of data from the computing apparatus to the call control server. Specific non-limiting examples include: the PSTN, including PBX and Centrex networks; and packet based networks which may include the public internet, or an intranet such as a LAN or a WAN.

Computing apparatus 112 may be further operable to accept input from a user and to display output to a user. In one embodiment computing apparatus 112 is a computer, such as a personal computer, typically comprised of hardware suitable for processing data and includes a central processing unit, a random access memory, hard-disk storage, a network interface for communicating over a communications network or data network, and removable media storage for transferring data from device to device. It is understood that computing apparatus 112 may be representative of a plurality of similar devices in communication with data network 122. Such devices may be located in a single facility, such as an office building, or geographically separated such as in different branches of a business. In some embodiments of the present invention, the computing apparatus 112 is located in a location distinct from that of the call control server 110. In other embodiments, the computing apparatus 112 can be co-located with the call control server 110. In a further embodiment the computing apparatus 112 may be connected directly to call control server 110, depicted in FIG. 1b.

Figure 4:
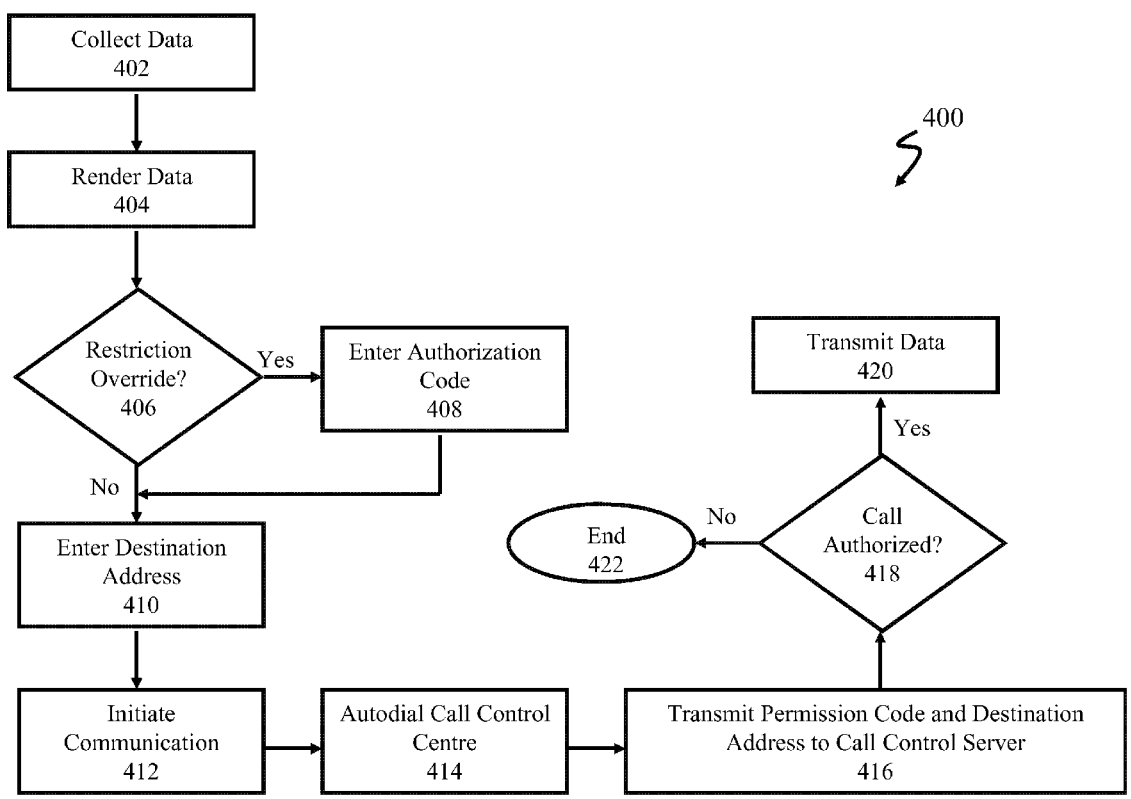
FIG. 4 is a flow chart depicting the steps performed to control the destination of a data transmission according to one embodiment of the present invention.

A method 400 for controlling the destination of a data transmission through a communications network according to an embodiment of the present invention will now be described with reference to FIG. 4. In order to assist in the explanation of the method, it will be assumed that method 400 is operated using the system 100 of FIG. 1. Furthermore, the following discussion of method 400 will lead to further understanding of system 100 and its various components. It should be understood that the steps in method 400 need not be performed in the sequence shown. Further, it is to be understood that system 100 and/or method 400 can be varied, and need not work as discussed herein in conjunction with each other, and that such variations are within the scope of the present invention.

By way of illustration only, method 400 will be described, when appropriate, using the non-limiting example of a fax machine. It should be understood, however, that method 400 is equally applicable to other communications devices which are operable to transmit data through a communications network. With reference to FIG. 4, at step 402 a user enters data to be transmitted into the originating communications device 102. In the example of a fax machine this would require placing the documents to be sent into the scanner as is well known to those of skill in the art. At step 404, originating communications device 102 renders the data into a form suitable for transmission through communication network 108. In the example of a fax machine the scanner scans the documents and stores the resulting data into the memory of the fax machine. The user is now ready to input the destination network identifier of the destination communications device 140, for example the phone number of a fax machine of the intended recipient of the documents to be transmitted.

However there may be default restrictions on the use of originating communications device 102 or on the destination communications device 140 as represented by a universal restriction associated with Table 200. If a user wishes to override the default restrictions on the originating communications device 102 at step 406, an Authorization Code is entered into the originating communications device 102 at step 408. For example fax machines within a business organization may only be nominally authorized to transmit data to other fax machines within the business organization, so called "internal" transmissions. Thus if a user wishes to transmit data to fax machine external to the business organization, for example to a customer, the Authorization Code is entered into the to the originating fax machine at step 408 using its keyboard.

Alternatively a user identifier apparatus may be connected to the originating communications devices 102 and this device may be used to enter the Authorization Code at step 408. The originating communications device 102 is then further enabled to collect this Authorization code from the user identifier apparatus. In some embodiments this user identifier apparatus may include a keyboard or other apparatus adapted to accept input from a user. In other embodiments the user identifier apparatus may comprise a smartcard reader or RFID reader, or other apparatus adapted to accept electronic input from an electronic device carried by a user. In alternative embodiments user identifier apparatus may include a voiceprint reader, or biometric scanners, such as fingerprint or retina scanners. In further embodiments the user identifier device may be fully integrated into the original communications device 102.

The Authorization code may be a generic override code associated with all originating communications devices 102. In further embodiments the Authorization code required to override a specific restriction may be associated with: specific geographic locations, for example all fax machines within a specific branch of a business; a specific originating communication device 102, for example a particular fax machine; or a specific user. Combinations of Authorization Codes are also within the scope of the present invention; as a non-limiting example, a first generic Authorization code may be required to override restrictions on all originating communications devices 102, and a second Authorization Code may be required to allow a user to accrue long distance charges, or to transmit data to a specific destination communications device. Other combinations of Authorization Code assignments will occur to those with skill in the art and are within the scope of the present invention.

After entering the Authorization Code, the destination network identifier of the destination communications device 140 is entered into the originating communications device 102 at step 410; in the example of the fax machine the telephone number of the destination fax machine is entered into the originating fax machine using the keyboard of the originating fax machine.

It is understood that the order of steps 410 and 404, steps 406 and 408, and step 410 may be varied in further embodiments. For example, the Authorization Codes and the destination address may be entered prior to entering and rendering the data. In the fax machine example, a user might enter the destination telephone number and code prior to scanning the documents. In a further example, the Authorization Code may follow the destination phone number; indeed various positional relationships between the Authorization Code and the destination network identifier are included within the scope of the invention and will occur to those with skill in the art. The format and length of the Authorization Code is limited only by the device used to enter the Authorization Code into the originating communications device 102; in the example of the fax machine the Authorization Code is limited to the characters present on the keyboard used to enter the code. In embodiments where a Authorization Code is not entered steps 406 and 408 may be omitted.

At step 412 the originating communications device 102 attempts to initiate communications with the destination communications device 140 through communications network 108, as is well known to those with skill in the art. In the example of the fax machine this may include actuating the "send" key in order to initiate a session within the PSTN or an IP network. Within the PSTN this will further include the fax machine sending a signal to a telephony switch to signal readiness to transmit the phone number of the destination fax machine. It is well known to those with skill in the art that the telephony switch within the PSTN will capture the CLID of second communications link 106 during this process.

However, instead of initiating a communications session with destination communications device 140 directly, when the communications session is initiated autodialer 104 intervenes at step 414 and connects originating communications device to data I/O apparatus 124 of the call control server 110, via interface 126. A simplified version of system 100 depicted in FIG. 1 is depicted FIG. 5, which further illustrates this process: originating communications device 102 is shown to be in communication with data I/O apparatus 124 via path 510 in the communications network. Autodialer 104 may be preprogrammed with the network identifier associated with call control server 110. In some embodiments, the network identifier can be a telephone number. In one specific non-limiting example, the telephone number is a toll-free number, such as 1-800-555-4441. In some embodiments of the present invention, all originating communication devices 102 may use the same telephone number associated with the call control server 110. One skilled in the art will appreciate that call control server 110 can manage multiple incoming calls in a manner well known in the art. It should be noted that if call control server 110 is used for provision of other services, call control server 110 uses the number dialled by the originating communication device 102 to establish the communication to determine that the system and the method according to this invention is to be used.

Alternatively, in embodiments where autodialer 104 is incorporated into originating communication 102 as hardware, firmware or software, step 412 may be omitted, and the combination of originating communications device 102 and autodialer 104 may be provisioned to connect originating communications device 102 with data I/O 124 without first attempting to initiate communications with destination communications device 140.

Once connected to call control server 110, originating communication device 102 transmits the Authorization Code, if any, and destination network identifier of destination communications device 140 to data I/O apparatus 124 at step 416, which receives the information. Continuing with the example of the fax machine connected through the PSTN, once the fax machine is connected to data I/O apparatus 124, the fax machine plays the DTMF (Dual Tone Multi-Frequency) tones of the characters representing the Authorization Code, if any, and the phone number of the destination fax machine. To facilitate transmission of the Authorization Code and destination network identifier, the originating communications device may have a built in delay to allow time for the autodialer 104 to connect to call control server 110. Alternatively, autodialer 104 may collect the information transmitted by communications device 102 and transmit this information to call control server 110 once connected to call control server 110. In the example of a fax machine playing DTMF tones, this may comprise autodialer 104 recording the relevant DTMF tones and replaying them to data I/O apparatus 124 once connected to call control server 110. In one embodiment autodialer 104 may be configured with a built in delay between pressing the send button and transmitting the recorded data. Should the call to call control server 110 not be completed, for example a busy signal is returned, one or both of autodialer 104 and originating communciaitons device 102, may be configure to timeout and hangup. As is well known to those of skill in the art fax machines may be configured with a redial feature which will continue attempting to transmit data. Alternatively an error report may be generated. In another embodiment autodialer 104 may be configured to detect when the call control server 110 has been engaged prior to transmission of said data.

At step 418 originating communication device 102 waits for a connection to destination communications device 140. The connection may occur via the call control server 110 as illustrated by paths 510 and 515 of FIG. 5. Alternatively call control server 110 may provide a signal to communications network 108 causing originating communications device 102 and destination communications device 140 to be directly connected through communications network 108 via path 520. A non-limiting example of a signalling event is an advanced intelligent network (AIN) signalling event and is well known to those of skill in the art. If the transmission is authorized, the originating communications device 102 is connected to the destination communications device 140 and the originating communications device 102 then transmits data to the destination communications device 140 at step 420. Step 420 may include handshaking steps, which are not illustrated, between the two devices to establish a communications session.

If the transmission is not authorized, the data is not transmitted and the attempt to transmit the data ends at step 422. Step 422 may include data I/O apparatus 124 conveying a message to a user of originating communications device 102 indicating that the transmission of data has not been authorized. Conveyance of this message would occur through network link 510 shown in FIG. 5, and may be in the form of a text message displayed on a display apparatus associated with originating communications device 102, or a pre-recorded voice message stored on data I/O apparatus 124, and broadcast through a speaker apparatus associated with originating communications device 102.

In further embodiments, other steps may occur which may also lead to step 422 resulting in the end of the attempt to transmit data. As a non-limiting example a failure to receive a handshake from destination communications device 140 may result in system 100 defaulting to step 422. Other reasons to end the data transmission may occur to those with skill in the art and are within the scope of the present invention.

Figure 6:
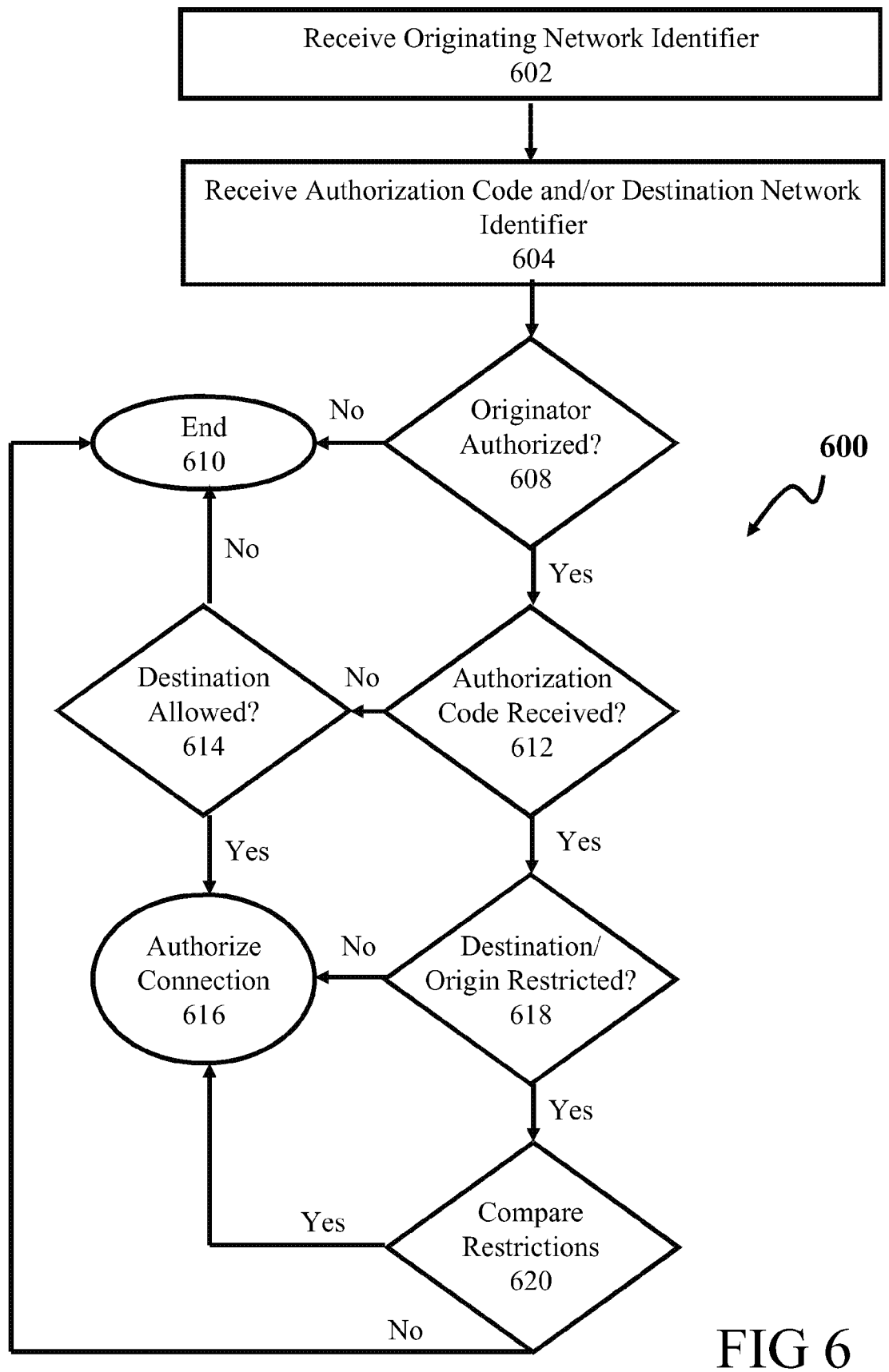
FIG. 6 is a flow chart depicting the steps performed to control the destination of a data transmission according to one embodiment of the present invention.

Method 600 for authorizing the transmission destination of the data collected at step 402 of method 400 is now described with reference to FIG. 6. At step 602 call control server 110 obtains a network identifier associated with the originating communication device 102. At step 604 call control server 110 receives the Authorization Code, if any, and destination network identifier information through data I/O Apparatus 124, sent by the originating communications device 102 at step 416 of method 400. In some embodiments of the present invention, the network identifier associated with the originating communication device 110 is the Caller Line ID (CLID) information associated with second communications link 106, which connects originating communications device 102 to communications network 108. The call control server 110 obtains CLID of the communication device 102 in a manner well known in the art. It is understood that the order of steps 602 and 604 may be varied in further embodiments.

At step 608, data control apparatus 128 compares the network identifier of originating communications device 102 to Table 200 stored in database 132, and accessed through LAN 134, to determine if originating communications device 102 is allowed to use system 100. If the received network identifier of originating communications device 102 is not present in Table 200, communication between originating communications device 102 and call control server 110 is severed at step 610. Alternatively, errors in communication with destination communications device 140, such as errors in the handshaking steps, may also lead to severing communications between call control server 110 and originating communications device 102. Step 610 may include data I/O apparatus 124 conveying a message to a user of originating communications device 102 indicating that access to system 100 is not authorized by this device. Conveyance of this message would occur through network link 510 shown in FIG. 5, and may be in the form of a text message displayed on a display apparatus associated with originating communications device 102, or a pre-recorded voice message stored on data I/O apparatus 124, and broadcast through a speaker apparatus associated with originating communications device 102. Step 608 prevents unauthorized communication devices from using system 100, however step 608 may be omitted in some embodiments. For example, a billing address is typically associated with each use of system 100. A user in possession of the relevant Authorization Code might use system 100 to transmit data from an unauthorized device, for example a home fax machine, resulting in unauthorized cost being to the billing address of system 100, if system 100 did not perform the authorization check at step 608.

At step 612 data control apparatus 128 compares the data received by the call control server at step 602 and examines it to determine if both a Authorization Code and a destination network identifier has been received, or only a destination Network identifier. If a destination network identifier only has been received, in other words a Authorization Code was not entered into originating communications device 102 by a user, method 600 proceeds to step 614. It is understood that data control apparatus 128 has been enabled to recognize the format of the Authorization Code and network identifier.

At step 614 the destination network identifier is compared to a list of network identifiers to which data is allowed to be transmitted, residing on database 132, which comprises a list of the destination network identifiers to which calls are allowed. In some embodiments this table may be Table 200, such that originating communication devices 102 which are allowed to use system 100 are further allowed to transmit data only to the set of all other communication device which are allowed to use system 100. For example this might restrict the employees of a business to faxing data only to other fax machines within the same business. However in further embodiments the list of network identifiers to which data is allowed to be transmitted may comprise a table distinct from Table 200.

Similarly at step 614, system 100 will determine what universal restrictions are associated with Table 200, for originating communications devices 102 allowed to use system 100. If originating communications device, 102, either is not in the list of allowed network identifiers, or has universal restrictions placed against it, the call is denied at step 610, in a manner similar to that described previously. Otherwise the call is authorized at step 616 in a manner which will now be described.

Figure 5:
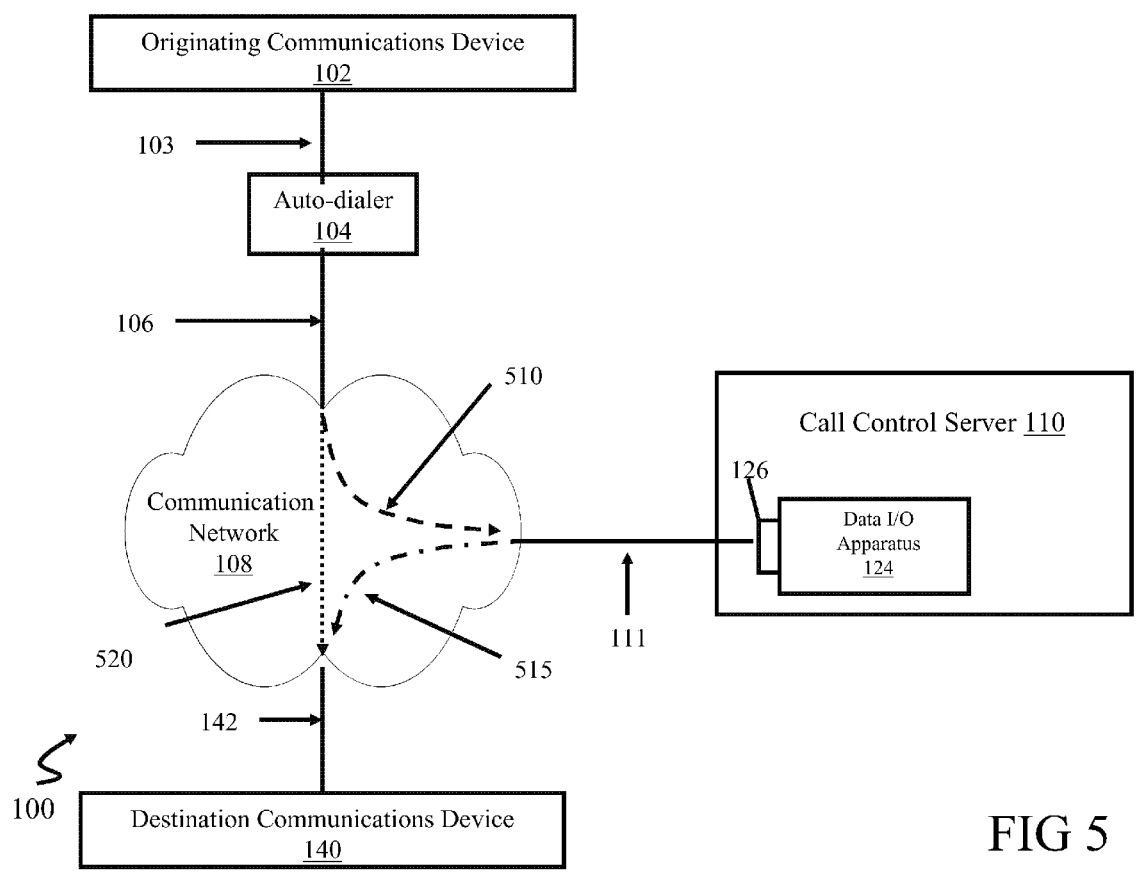
FIG. 5 is a block diagram illustrating the signal flow of a system for controlling the destination of a data transmission according to one embodiment of the present invention.

In step 616 the call control server 110 authorizes the connection between originating communications device 102 and destination communications device 140. In one embodiment of the present invention, the data control apparatus 128 performs an enhanced application network (EAN) three-way call well known to those of skill in the art by connecting originating communications device 102, already in communication with data I/O apparatus 124 via link 510, to destination communications device 140, via communications link 515, using the stored destination network identifier to initiate communications link 515, as depicted in FIG. 5. In an alternate embodiment data control apparatus 128 instructs data I/O apparatus 124 to communicate to communication network 108 to directly link originating communications device 102 with destination communications device 140 via communications link 520, as depicted in FIG. 5; communication link 510 is subsequently severed. It is understood that in some embodiments data control apparatus 128 may provide further instructions to route the call through a DTFG Platform should call control server 110 be DTFG enabled. In these embodiments communications link 520 is established and communications link 510 is subsequently severed in a manner well known to those of skill in the art.

It is yet further understood that in embodiments using RLT, communications links 510 and 515 are first established, and communications link 520 is subsequently established to directly connect originating communications device 102 and destination communications device 140; once communications link 520 is established communications links 510 and 515 are dropped. It will be appreciated that the communication network 108 comprises all the required elements to switch the call to the destination; in a non-limiting example communications network comprises the PSTN and includes, all necessary switching elements, such as DMS-type switches, Signal Transfer Points and other elements well known in the art and not shown in FIG. 1 for the sake of simplicity.

Returning to step 612, if call control apparatus 110 determines via data control apparatus 128 that a Authorization Code has been received, at step 618 call control apparatus 110 examines destination network identifier to Table 300 to determine if the identifier is within the list of restricted network identifiers 310. In a further embodiment, at step 618 call control apparatus 110 may determine if the originating network identifier is within the list of restricted network identifiers 310. In either case, if the identifier is not within the list of restricted network identifiers 310, system 100 passes to step 616 and the connection is authorized in the manner previously described.

If the network identifier of either device appears within the list of restricted network identifiers 310, at step 620 the restrictions are examined, represented by first restriction 312, second restriction 314, further restrictions not depicted or universal restrictions associated with Table 300, to determine if the data transmission being attempted by originating communication device 102 is within the scope of the restrictions. If the data transmission being attempted is within the scope of the restrictions the data transmission is denied and control passed to step 610, in the manner previously described; if the data transmission being attempted is outside the scope of the restrictions the data transmission is denied and control passed to step 616, in the manner previously described.

By way of example only, and with reference to FIG. 3a, first restriction 312 may indicate if an originating communications device 102 associated with a restricted network identifier 310 is restricted from transmitting data, while second restriction 314 may indicate if a destination communications device 140 associated with a restricted network identifier 310 is restricted from receiving data. Thus if call control server 110 receives an attempt to transmit data to a destination network communications apparatus 140, whose network identifier appears as a restricted network identifier 310 in Table 300, call control server 100 looks up the restrictions on destination network identifier, in the example second restriction 314, to determine if data transmissions to this destination network identifier are allowed. As an example, within Table 300, restricted network identifier 310, 204-555-1236 has second restriction 314 of "YES". Hence system 100 would pass control to step 616 and the data transmission would be authorized. Alternatively, within Table 300, specific network identifier 310, 204-555-1237 has second restriction 314 of "NO". Hence system 100 would pass control to step 610 and the data transmission would be authorized. In an alternative embodiment data I/O apparatus 124 may transmit a message to originating communications device 102 indicating the reason that the call was terminated in a manner previously described. However, if the nature of the attempted communication between the originating communications device 102 and the destination communications device 140 is within the set of restrictions described by first restriction 312, second restriction 314 or further restrictions not illustrated, or restrictions represented by Table 350, the call is authorized at step 616 in a manner which has been previously described.

It would be understood by a person of skill in the art that restrictions represented by first restriction 312, second restriction 314, further restrictions not depicted or universal restrictions associated with Table 300, may be set by an administrator of System 100, in the form of an instruction stored in a component of call control server 110, for example database 132 or data control apparatus 128. It is further understood that the response of call control server 110 to the attempt by originating communication device 102 to transmit data to destination communication device 140 is dependent on the nature of the restriction. It is further understood that the restrictions defined by first restriction 312, second restriction 314, further restrictions not depicted or universal restrictions associated with Table 300 may be in the form of a limitation imposed on the listed restricted network identifiers 310 or, in an alternative embodiment, in the form of a limitation imposed on network identifiers absent from the list of restricted network identifiers 310.

If Table 350 is present in database 132, at step 618 system 100 may also compare the restrictions associated with restricted network identifiers 310, as represented by restricted destination network identifiers 360.

Figure 7:
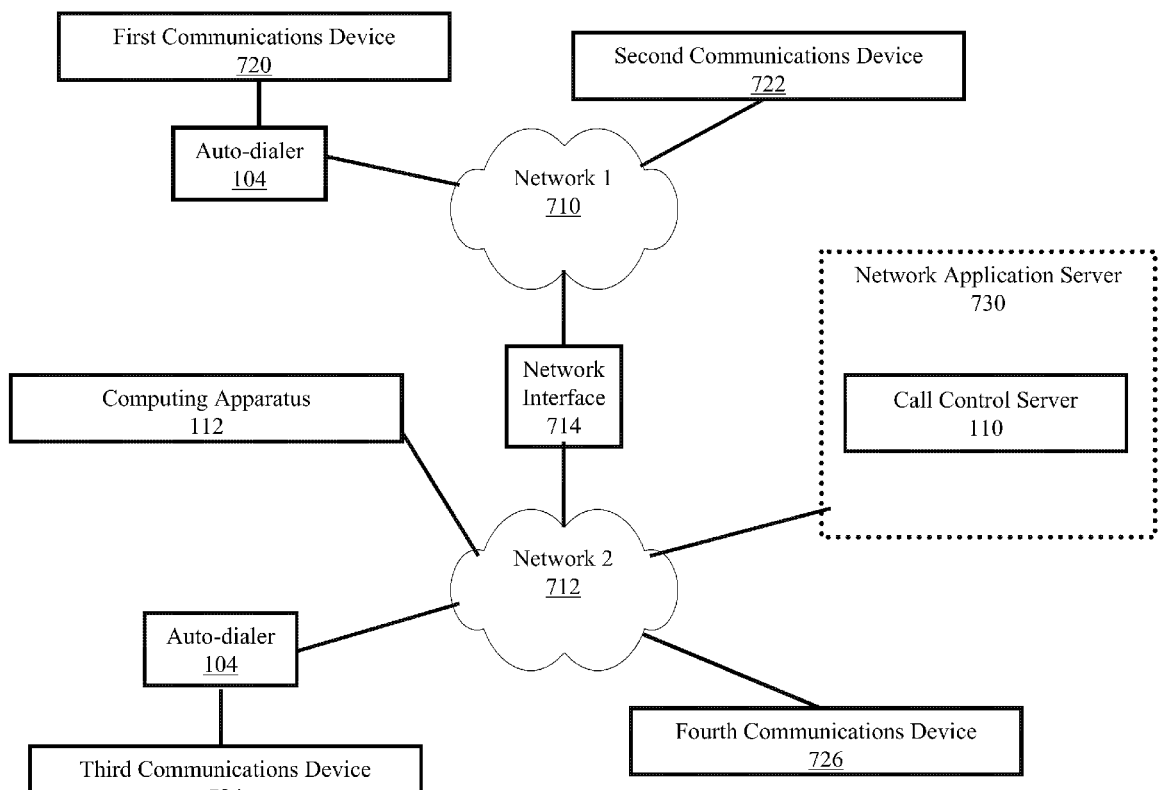
FIG. 7 is a block diagram illustrating a system for controlling the destination of a data transmission according to a further embodiment of the present invention.

FIG. 7 depicts a system 700 for controlling the destination of a data transmission through a network according to an alternative embodiment of the present invention. System 700 includes a first network 710 and a second network 712 connected via a network interface 714. First network 710 and second network 712 may include any network which allows for transmission of data from an originating address to a destination address. Specific non-limiting examples include: the PSTN, including PBX and Centrex networks; and packet-based networks, which may include the public internet, or an intranet such as a LAN or a WAN. Typically one of first network 710 or second network 712 will be an analog network, such as the PSTN, while the other network may be a digital network, such as an IP network. Network interface 714 may be an interface which enables communication between first network 710 and second network 712, for example translating digital communications to analog communications, and analog communications to digital communications. An example of a network interface is a PSTN bridge, well known to one of skill in the art.

System 700 includes at least one communications device, such as first communication device 720, connected to first network 710, similar to originating communications device 102 described previously, with reference to FIG. 1a. System 700 may include a second communications device 722, connected to first network 710, similar to destination communications device 140 described previously, with reference to FIG. 1a. System 700 may include a third communication device 724, connected to second network 712, similar to originating communications device 102 described previously, with reference to FIG. 1a. System 700 may include a fourth communications device 726, connected to second network 712, similar to destination communications device 140 described previously, with reference to FIG. 1a.

System 700 includes call control server 110, similar to that described with reference to FIG. 1a. In some embodiments call control server 110 may reside inside a network application server 730, similar to that described with reference to FIG. 7. Call control server 110 is connected to one of first network 710 or second network 712, or in embodiments which include network application server 730, through network applications server 730. In the embodiment depicted in FIG. 7 call control server 110 is depicted inside network application server 730, and is shown connected to second network 712.

System 700 may further include computing apparatus 112, similar to that described with reference to FIG. 1a, connected to one of first network 710 and second network 712. Computing apparatus 112 exchanges information with database 136 in the manner described previously.

System 700 further includes autodialers, not depicted for simplicity, similar to autodialer 104 described previously, associated with each of first communications device 720 and third communications device 724, in a manner similar to that described previously, which similarly intervene with attempts by the communications device to contact another communications device, and instead contacts call control server 110. However, in embodiments where call control server is connected to Network 2 712, Network 712 being the public internet, call control server 110 will be associated with an internet protocol address rather than a telephone number. Hence autodialers associated with each communications device may be configured to communicate with call control server by "dialing" said internet protocol address, rather than a standard phone number. Alternatively, the internet protocol address of call control server 110 may be associated with a telephone number, and hence autodialers associated with each communications device may behave in a substantially similar manner to autodialer 104, Network Interface 714 facilitating communication between said autodialer and call control server 110.

System 700 may further include interface devices, for example ATAs, between each communications device to transform data from said communications devices into a form suitable for transmission over the first network 710 or second network 712.

In a non-limiting example, first communications devices 720 and second communications device 722 may be fax machines adapted for transmission of data over the PSTN.

Network 1 710 is the PSTN, while Network 2 712 is the public internet, and Network Interface 714 is a PSTN bridge, well known to those of skill in the art. Alternatively one or both of first communications device 720 and second communications device 722 may be a fax machine adapted for transmission of data over the internet, such as a fax over IP terminal; in this example fax over IP terminals connected to the PSTN would require an adaptor to convert data formatted for packet based transmission to data formatted for transmission over the PSTN.

Third communications devices 724 and second communications device 726 may be fax machines adapted for transmission of data over the internet, such as Fax over IP terminals. Alternatively one or both of third communications device 724 and fourth communications device 726 is a standard fax machine adapted for transmission of data over the PSTN; in this example standard fax machines connected to the internet would require an adaptor, such as an ATA, to convert data formatted for transmission over the PSTN to data formatted for packet based transmission over the internet.

In the example where first communications device 720 is a fax machine attempting to send transmit data to second communications device 722, another fax machine, system 700 will behave in a substantially similar manner to system 100. In the example where first communications device 720 is a fax machine attempting to send a fax to one of third communications device 722 or fourth communications device 724, one or both being fax over IP terminals, system 700 will behave in a substantially similar manner to system 100, however the network identifier of third communications device 722 and fourth communications device 724 may be an internet protocol address, such as 123.45.67.97, or a domain name associated with the internet protocol address. Hence network identifiers recorded in Tables 300 and 350 may also be in the form of an internet protocol address or associated domain name.

Similarly in embodiments where third communications device 724 is attempting to transmit data to one of first communications device 720 or second communications device 722, network identifiers recorded in Table 200 may also be in the form of an internet protocol address or associated domain name.

Methods 400 and 600 may be operated using system 700. Data transmissions may originate at either of first communications device 720 or third communications device 724 and be directed at one of second communications device 722 or fourth communications device 726. Routing of the Authorization Code and network identifiers through the network, first to call control server 110, and later to the relevant communications device occurs in manner well known to those of skill in the art.

The above description has been provided primarily using an example of a fax machine. It should be understood that teachings of the present invention are applicable to any other communications device of similar functionality. Furthermore, the examples provided have particularly referred to the use of a smart card to provide user identification 402. A person skilled in the art having regard to the teachings of this invention will appreciate the user identification can be obtained using retina scan, fingerprint scan or any other biometric scans. Equally, the smart card information can be substituted or augmented with a PIN code supplied to each user.

Even though the data control apparatus 128 and the data I/O apparatus 124 have been described as separate apparatuses, it should be understood that they can be embodied in a single apparatus. It should further be understood that even though certain steps of method 600 have been described in terms of the data control apparatus 128 instructing the data I/O apparatus 124 to perform certain steps, the data I/O apparatus 124 can comprise the required logic to perform some of the steps on its own without being instructed by the data control apparatus 128.

The control server 110 has been described comprising a call data base 132. A person skilled in the art should appreciate that the call database 132 can comprise two or more fully redundant call databases 132. In additional embodiments call database 132 may be external to call control server 110.

Therefore, according to the teachings of the present invention a method, system and apparatus for controlling the establishment of a data connection from an originating data device are provided. Furthermore, the present invention enables organizations, such as businesses, to control the establishment of a data connection from an originating data device within the organization to destination data device both internal and external to the organization.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

We claim:

1. A method executable within a system comprising a computing apparatus connectable to an originating data device via a public switched telephone network (PSTN), the method comprising:
   receiving at a call control server over a path in the PSTN established with an autodialer a request from said originating data device for a session with a destination data device, said request comprising a destination identifier associated with said destination data device, the path in the PSTN being established by autodialing of the autodialer;
   determining if said request is authorized based upon said destination identifier;
   triggering establishment of a connection over the PSTN between said originating data device and said destination data device by sending a call control command to the PSTN if said request is authorized, wherein said connection does not traverse the call control server.

2. The method of claim 1, further comprising receiving an originating identifier associated with said originating data device and deterimining if said originating data device is authorized to make said request based upon said originating identifier.

3. The method of claim 2, wherein said determining if said request is authorized and said triggering establishment of a connection are performed only if said originating device is authorized to make said request.

4. The method of claim 2, wherein said triggering occurs only if said originating device is authorized to make said request and said request is authorized.

5. The method of claim 2, wherein said originating identifier is a telephone number associated with said originating data device.

6. The method of claim 2, wherein determining if said originating device is authorized to make said request comprises determining if said originating identifier is within a set of one or more approved originating identifiers.

7. The method of claim 1, wherein said request further comprises an authorization identifier and wherein determining if said request is authorized further comprises determining if said authorization identifier is within a set of one or more approved authorization identifiers.

8. The method of claim 7, wherein said authorization identifier is associated with a specific user of said originating data device.

9. The method of claim 1, wherein determining if said request is authorized comprises determining if said destination identifier is within a set of one or more approved destination identifiers.

10. The method of claim 9, wherein said request further comprises an authorization identifier and wherein said determining if said request is authorized further comprises determining if said authorization identifier is within a set of one or more approved authorization identifiers when said destination identifier is not within the set of one or more approved destination identifiers; wherein said request is considered to be authorized if said authorization identifier is within said set of one or more approved authorization identifiers when said destination identifier is not within the set of one or more approved identifiers.

11. The method of claim 1, wherein determining if said request is authorized comprises determining if said destination identifier is within a set of one or more restricted destination identifiers.

12. The method of claim 11, wherein said request further comprises an authorization identifier and wherein said determining if said request is authorized further comprises determining if said authorization identifier is within a set of one or more approved authorization identifiers when said destination identifier is within the set of one or more restricted destination identifiers; wherein said request is considered to be authorized if said authorization identifier is within said set of one or more approved authorization identifiers when said destination identifier is within the set of one or more restricted destination identifiers.

13. The method of claim 1, wherein said determining if said request is authorized comprises determining if said destination identifier is representative of a non-toll telephone number.

14. The method of claim 13, wherein said request further comprises an authorization identifier, wherein said determining of said request is authorized further comprises determining if said authorization identifier is within a set of one or more approved authorization identifiers when said destination identifier is not representative of a non-toll telephone number; and wherein said request is considered to be authorized if said authorization identifier is within said set of one or more approved authorization identifiers when said destination identifier is not representative of a non-toll telephone number.

15. The method according to claim 1, wherein said call control command comprises a release link trunking signal.

16. The method according to claim 1, wherein said call control command comprises a dynamic toll-free gateway signal.

17. The method according to claim 1, wherein said originating data device is a fax machine and said destination data device is a fax machine.

18. The method according to claim 1, wherein said originating data device is a modem and said destination data device is a modem.

19. A computing apparatus connectable to an originating data device via a public switched telephone network (PSTN), the computing apparatus comprising:

an interface operable to receive over a path in the PSTN established with an autodialer a request from said originating data device for a session with a destination data device, said request comprising a destination identifier associated with said destination data device, the path in the PSTN being established by autodialing of the autodialer;

a processing apparatus, coupled to the interface, operable to determine if said request is authorized based upon said destination identifier, and further operable to trigger establishment of a connection over the PSTN between said originating data device and said destination data device by transmitting a call control command to the PSTN if said requested is authorized, wherein said connection does not traverse the computing apparatus.

20. The computing apparatus of claim 19, wherein said interface is further operable to receive an originating identifier associated with said originating data device and wherein said processing apparatus is operable to determine if said originating data device is authorized to make said request based upon said originating identifier.

21. The computing apparatus of claim 20, wherein said processing apparatus is operable to determine that said request is authorized and to trigger establishment of the connection only if said originating device is authorized to make said request.

22. The computing apparatus of claim 20, wherein said processing apparatus is operable to trigger establishment of the connection over the PSTN between said originating data device and said destination data device only if said originating device is authorized to make said request and said request is authorized.

23. The computing apparatus of claim 20, wherein said originating identifier is a telephone number associated with said originating data device.

24. The computing apparatus of claim 20 wherein said processing apparatus is operable to determines if said originating data device is authorized to make said request by determining if said originating identifier is within a set of one or more approved originating identifiers.

25. The computing apparatus of claim 24, further comprising a database, said database comprising said set of one or more approved originating identifiers; wherein said processing apparatus is operable to access said database to determine if said originating identifier is within said set of one or more approved originating identifiers.

26. The computing apparatus of claim 19, wherein said request further comprises an authorization identifier and wherein said processing apparatus is adapted to determine if said request is authorized by determining if said authorization identifier is within a set of one or more approved authorization identifiers.

27. The computing apparatus of claim 26, further comprising a database, said database comprising said set of one or more approved authorization identifiers; wherein said processing apparatus is operable to access said database to determine if said authorization identifier is within said set of one or more approved authorization identifiers.

28. The computing apparatus of claim 19, wherein said processing apparatus is operable to determine if said request is authorized by determining if said destination identifier is within a set of one or more approved destination identifiers.

29. The computing apparatus of claim 28, further comprising a database, said database comprising said set of one or more approved destination identifiers; wherein said processing apparatus is operable to access said database to determine if said destination identifier is within said set of one or more approved destination identifiers.

30. The computing apparatus of claim 28, wherein said request further comprises an authorization identifier and wherein said processing apparatus is operable to determine that said request is authorized if said authorization identifier is within a set of one or more approved authorization identifiers when said destination identifier is not within said set of one or more approved destination identifiers.

31. The computing apparatus of claim 30, further comprising a database, said database comprising said set of one or more approved authorization identifiers; wherein said processing apparatus is operable to access said database to determine if said authorization identifier is within said set of one or more approved authorization identifiers.

32. The computing apparatus of claim 19, wherein said processing apparatus is operable to determine said request is authorized if said destination identifier is not within a set of one or more restricted destination identifiers.

33. The computing apparatus of claim 32, wherein said request further comprises an authorization identifier and wherein said processing apparatus is operable to determine that said request is authorized if said authorization identifier is within a set of one or more approved authorization identifiers when said destination identifier is within said set of one or more restricted destination identifiers.

34. The computing apparatus of claim 33, further comprising a database, said database comprising said set of one or more approved authorization identifiers; wherein said processing apparatus is operable to access said database to determine if said authorization identifier is within said set of one or more approved authorization identifiers.

35. The computing apparatus of claim 19, wherein said processing apparatus is operable to determine that said request is authorized if said destination identifier is representative of a non-toll telephone number.

36. The computing apparatus of claim 35, wherein said request further comprises an authorization identifier and wherein said processing apparatus is operable to determine that said request is authorized if said authorization identifier is within a set of one or more approved authorization identifiers when said destination identifier is not representative of a non-toll telephone number.

37. The computing apparatus of claim 36, further comprising a database, said database comprising said set of one or more approved authorization identifiers; wherein said processing apparatus is operable to access said database to determine if said authorization identifier is within said set of one or more approved authorization identifiers.

38. A computing apparatus connectable to an originating data device via a public switched telephone network (PSTN), the computing apparatus comprising:

means for receiving at a call control server over a path in the PSTN established with an autodialer a request from said originating data device for a session with a destination data device, said request comprising a destination identifier associated with said destination data device, the path in the PSTN being established by autodialing of the autodialer;

means for determining if said request is authorized based upon said destination identifier;

means for triggering establishment of a connection over the PSTN between said originating data device and said destination data device by sending a call control command to the PSTN if said request is authorized, wherein said connection does not traverse the call control server.

* * * * *